United States Patent
Bakry et al.

(10) Patent No.: US 10,878,676 B1
(45) Date of Patent: Dec. 29, 2020

(54) METHODS AND SYSTEMS FOR CUSTOMIZATION OF VIDEO MONITORING SYSTEMS

(71) Applicant: Amazon Technologies, Inc., Seattle, WA (US)

(72) Inventors: Amr Bakry, Santa Clara, CA (US); Mashhour Solh, San Jose, CA (US)

(73) Assignee: AMazon Technologies, Inc., Seattle, WA (US)

( * ) Notice: Subject to any disclaimer, the term of this patent is extended or adjusted under 35 U.S.C. 154(b) by 50 days.

(21) Appl. No.: 15/885,132

(22) Filed: Jan. 31, 2018

(51) Int. Cl.
*G08B 13/196* (2006.01)

(52) U.S. Cl.
CPC ... *G08B 13/19615* (2013.01); *G08B 13/1966* (2013.01); *G08B 13/19645* (2013.01); *G08B 13/19682* (2013.01); *G08B 13/19684* (2013.01)

(58) Field of Classification Search
CPC .......... G08B 13/19615; G08B 13/1966; G08B 13/19645; G08B 13/19682; G08B 13/19684
See application file for complete search history.

(56) References Cited

U.S. PATENT DOCUMENTS

| | | | | |
|---|---|---|---|---|
| 2016/0005281 | A1* | 1/2016 | Laska | H04N 7/181 348/143 |
| 2018/0232592 | A1* | 8/2018 | Stewart | G08B 13/19606 |
| 2018/0286206 | A1* | 10/2018 | Kuramoto | A61B 5/00 |
| 2019/0266872 | A1* | 8/2019 | Nitta | G08B 21/043 |

* cited by examiner

*Primary Examiner* — James M Pontius
(74) *Attorney, Agent, or Firm* — Kilpatrick Townsend & Stockton LLP (57) ABSTRACT

A computer-implemented method includes receiving data including a plurality of objects. The data includes, for each of the plurality of objects, an activity, a location, a time period of interest, and a notify/suppress indicator associated with each of the plurality of objects. The method also includes receiving an indication of a specific object of the plurality of objects, receiving a video stream, and detecting, for the specific object, occurrence of the activity in the location during the time period of interest. The method further includes determining that the notify/suppress indicator is associated with notification and generating a notification related to the occurrence of the activity in the location during the time period of interest.

21 Claims, 8 Drawing Sheets

METHODS AND SYSTEMS FOR CUSTOMIZATION OF VIDEO MONITORING SYSTEMS

BACKGROUND

With the advancement of technology, the use and popularity of electronic devices has increased considerably. Electronic devices are commonly used to capture and process image data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cameras can be utilized in video monitoring, for example, home monitoring applications, enabling a user to monitor activity in their home or other location and generate alerts, for example, based on the detection of motion or the detection of a person in the home. For purposes of clarity, video monitoring will be described in the context of home monitoring herein, but it will be appreciated that embodiments of the present disclosure are applicable in other video monitoring environments, including offices, commercial establishments, outdoor spaces, public spaces, and the like. In conventional systems, home monitoring is based on a pre-defined set of actions or sounds, for example, "person detected" or "motion detected." Because these systems operate using pre-defined actions or sounds, the usability and results are limited. In fact, a large number of the notifications can be of little interest to the user, for example, a notification that a pet has been detected when the user is well aware that a pet is present in the home.

To address these shortcomings in conventional home monitoring applications, embodiments of the present disclosure enable a user to personalize and customize a home monitoring application by personalizing an object present in an image or video (e.g., a person, pet, or the like) and/or defining specific activities that will be recognized (e.g., a child crawling toward a window). Additionally, in addition to personalization of the home monitoring application to detect specific objects or activities, embodiments of the present disclosure enable a user to specify other specific objects or activities that are to be ignored, with notifications suppressed for these specific objects or activities. As an example, people who live in the home can be identified and the presence of these people in the home will not trigger a notification, thereby preventing the unnecessary notifications associated with conventional home monitoring systems. Accordingly, specific objects (e.g., people, pets, or the like) and/or activities can be ignored while still detecting and tracking other objects and/or activities. Moreover, specific activities performed by specific objects (e.g., people), can be detected and tracked while ignoring other specific activities performed by other specific objects.

Figure 1:
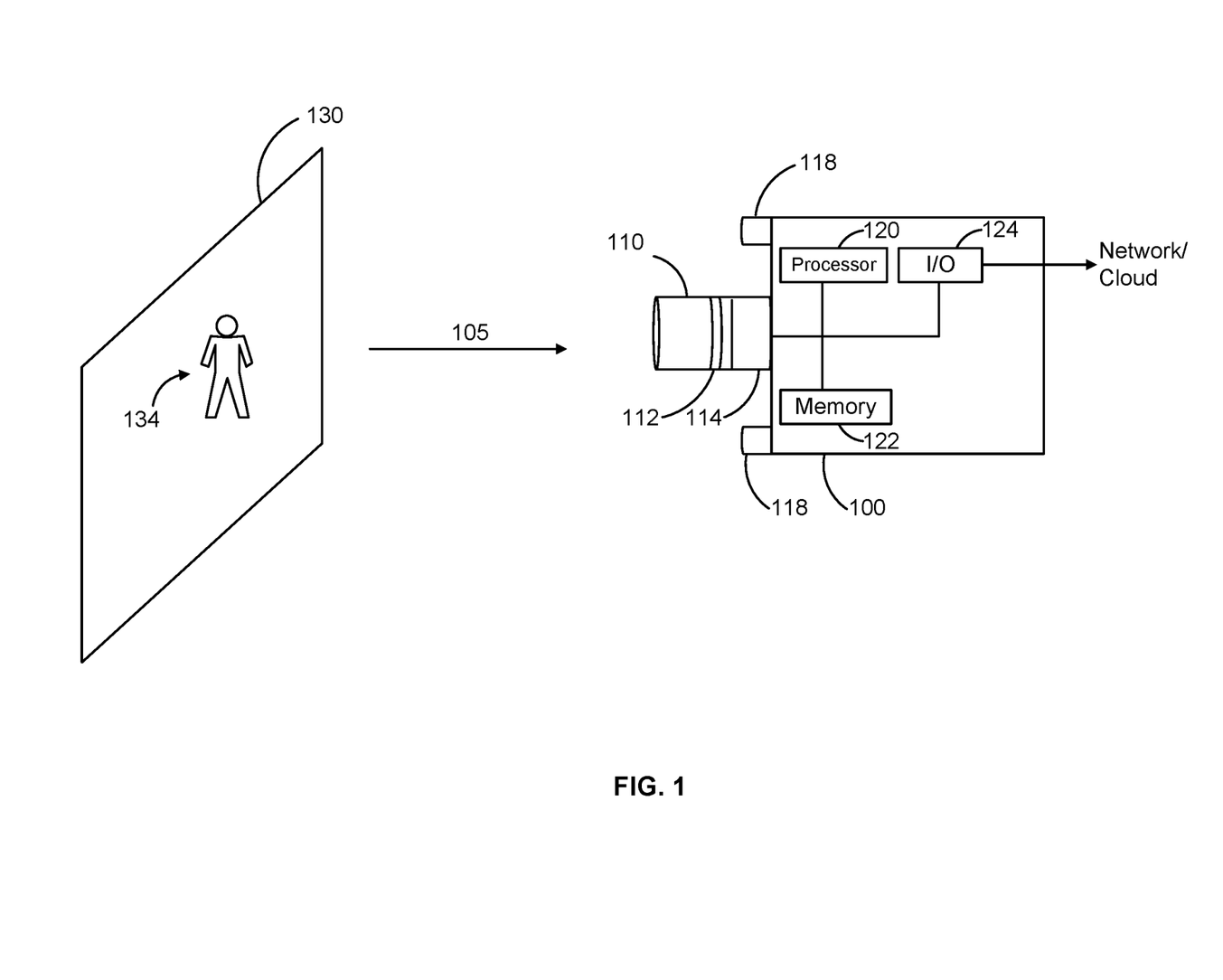
FIG. 1 is a simplified schematic diagram of a camera system according to examples of the present disclosure.

FIG. 1 is a simplified schematic diagram of a camera system according to examples of the present disclosure. The camera system 100, which can be a video camera, includes an optical imaging lens 110, an IR filter 112, an image sensor 114, and illuminations sources 118. The IR filter 112, which can be removed from the optical path aligned with the optical axis, for example, mechanically or electrically, can be utilized in conjunction with an IR imaging mode. In some embodiments, the illumination sources 118, which can include one or more IR LEDs, are positioned such that they circumferentially surround the image sensor 114. The camera system also includes a processor 120 and a non-transitory data storage device 122 (e.g., memory) in communication with the processor 120. The non-transitory data storage device 122 may be or include any suitable type of volatile or non-volatile data storage device including, for example, flash memory, random access memory, disk-based storage, etc. The camera system further includes I/O interface 124, which can be communicatively coupled to one or more networks and/or the cloud. The one or more networks and/or the cloud can provide back-end services/servers that can, in conjunction with processor 120, or in a stand-alone manner, perform the methods described herein, including generating notifications based on detection of objects/actions in a video stream, and the like.

Storage media or computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

Light enters the camera system 100 along optical axis 105 and the imaging plane of the image sensor 114 is substantially perpendicular to the optical axis 105. During operation in RGB mode, ambient light illuminates objects in the field of view of the camera and these objects are imaged using the image sensor 114. As an example, the field of view of object plane 130, which can be imaged on the image plane of the image sensor 114, includes a person 134 in a central region of the field of view. Although an object plane 130 is illustrated in FIG. 1, it will be appreciated that items at different distances from the camera system can be imaged and use is not limited to objects lying in a single plane. One of ordinary skill in the art would recognize many variations, modifications, and alternatives.

During operation, a video stream is captured that can be utilized to enable the operation of computer vision (CV) detection algorithms, which, for example, can detect the presence of humans or other animals, can detect motion in the field of view, or the like. Embodiments provide for operation during daylight using ambient illumination or during the night using illumination sources 118 to generate IR light that illuminates the objects in the field of view in IR mode.

Figure 2:
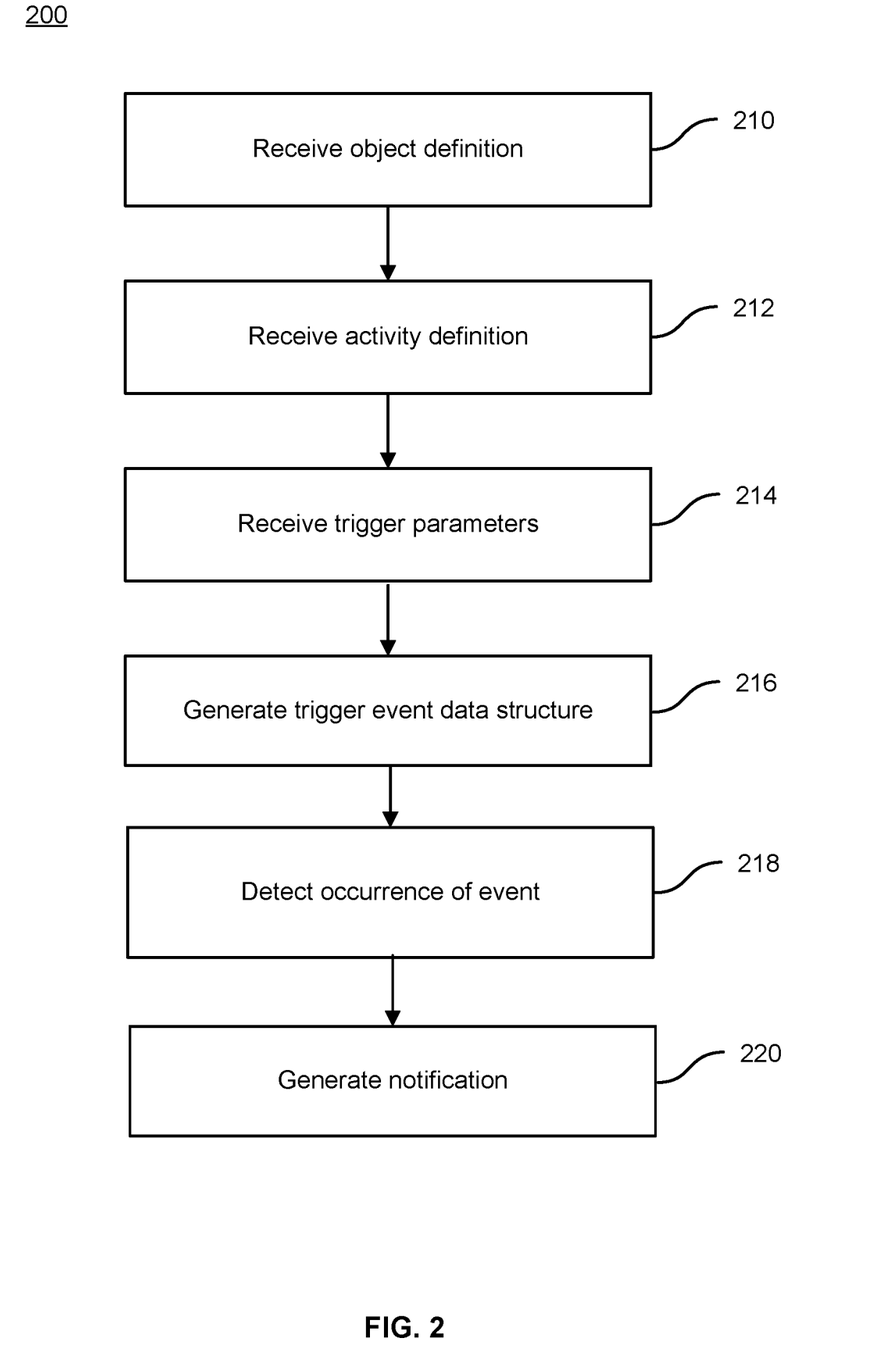
FIG. 2 is a flowchart conceptually illustrating customized event tracking according to examples of the present disclosure.
Figure 7:
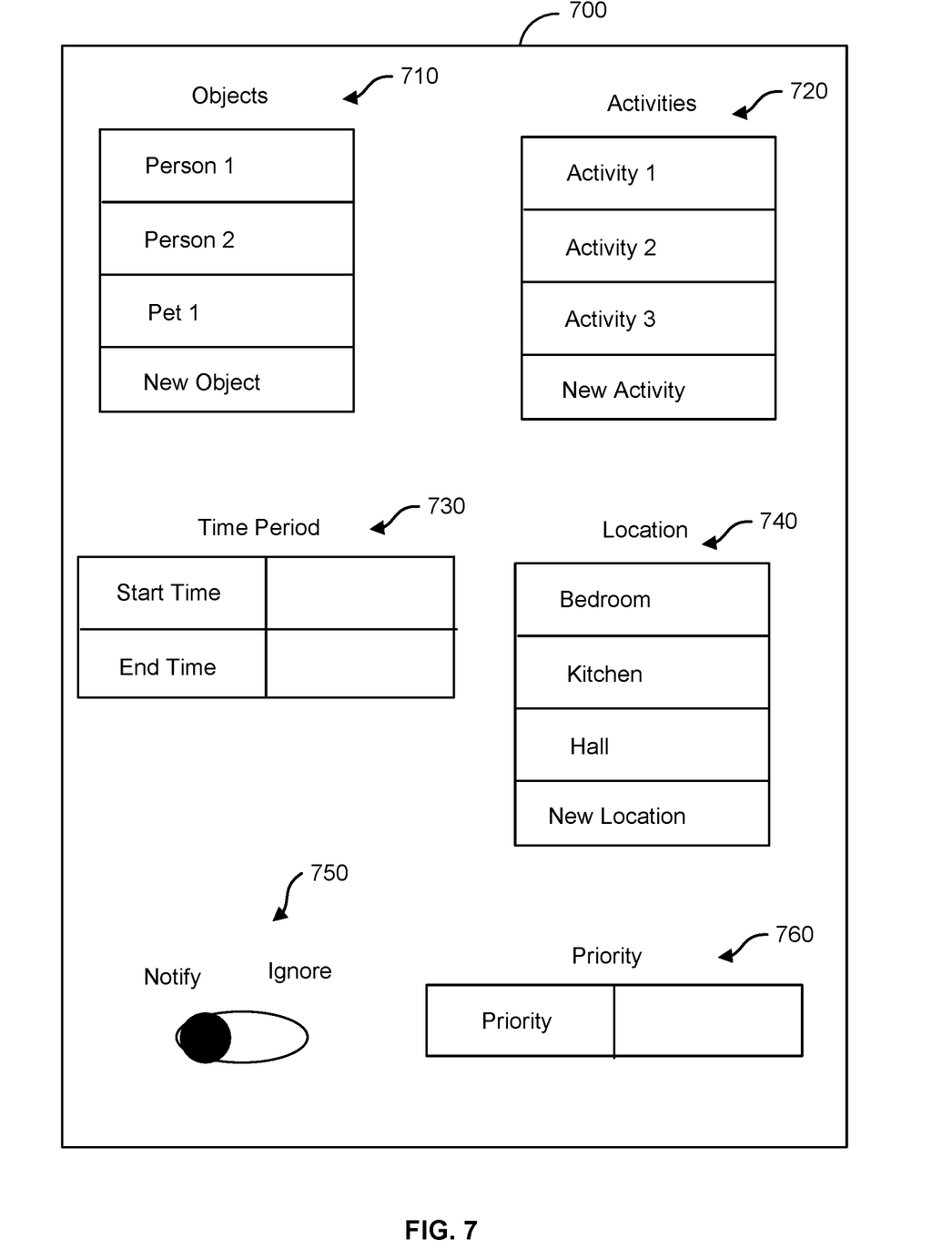
FIG. 7 is a simplified graphical user interface according to examples of the present disclosure.

FIG. 2 is a flowchart conceptually illustrating a method of generating a notification using a home monitoring system according to examples of the present disclosure. As described herein, embodiments of the present disclosure enable customized event tracking that is not available using conventional systems. The method 200 can be used in the context of a home monitoring system including at least one camera and includes receiving an object definition (210). As described in additional detail with respect to FIG. 3, the selection/definition of the object can include selecting a pre-defined object or adding a new object to the trigger event data structure. In an implementation in which the object is pre-defined and as illustrated in FIG. 7, a graphical user interface can be used to display a list of known objects including a specific object to a user. Given this list, the user can select the specific object.

The method also includes receiving an activity definition (212). As described in additional detail with respect to FIG. 4, the selection/definition of the activity can include selecting a pre-defined activity or adding a new activity to the trigger event data structure. In an implementation in which the activity is pre-defined and as illustrated in FIG. 7, a graphical user interface can be used to display a list of known activities including a specific activity associated with the specific object to a user. Given this list, the user can select the specific activity, which can be associated with the specific object selected at (210).

Figure 5:
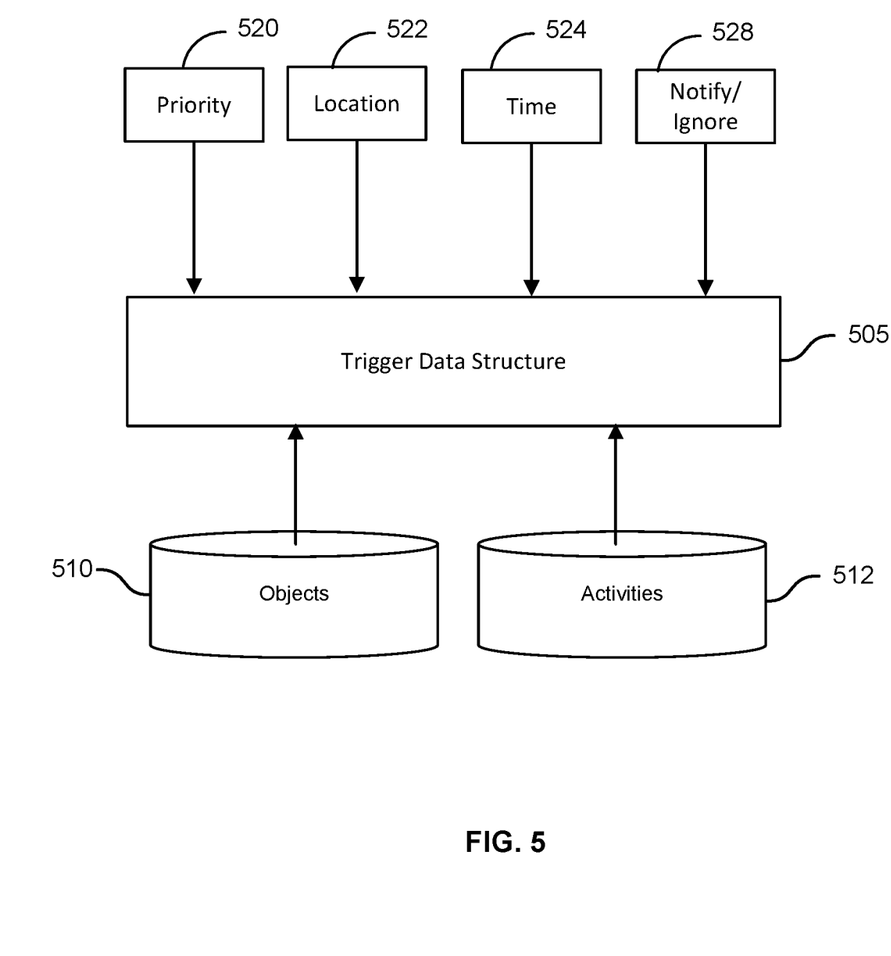
FIG. 5 is a simplified schematic diagram illustrating a trigger event data structure according to examples of the present disclosure.

The method further includes receiving trigger parameters (214). As illustrated in FIG. 5, these trigger parameters can include a priority indicator, a specific location, a time period of interest, and a notify/suppress indicator. Accordingly, in some embodiments, the method includes, as part of the process of receiving the trigger parameters, displaying, to the user, a list of locations including a specific location, and receiving, from the user, a selection of the specific location. In some embodiments, new locations can be added to the trigger event data structure and selected as the specific location. The location, which can also be referred to as a region of interest) can be defined in terms of a room in which the camera is located or the portion of a field of view (i.e., a zone) associated with the camera. In some embodiments, the location can be defined in relation to one or more objects present in the field of view. For example, if a user wants to track motion of a child towards a window, the location can be defined as the area of the field of view adjacent (e.g., within 3 feet) of the window, thereby defining a bounding box. This region of interest can be defined by the user, for instance by defining pixels included in the region of interest, defined using a computer vision algorithm, for example, using visual features of the window (e.g., an object detector), relative coordinates in the field of view, objects referenced to the relative coordinates, GPS coordinates, or the like. Alternatively, the location can be defined as the area of the field of view covered by the object, for instance, the window. Thus, locations including more than one room, one room, a portion of a room, an outdoor area, or a portion of a room related to an object in the room can be utilized depending on the particular application.

Additionally, the method can include, as part of the process of receiving the trigger parameters, a receiving, from the user, a time period of interest, also referred to as a time period, which can be associated with the specific activity, which can be associated with the specific object. The method can also include receiving, from the user, a priority indicator and a notify/suppress indicator. Both the priority indicator and the notify/suppress indicator can be associated with the specific activity that is associated with the specific object. As an example, the user can utilize a user device to provide an indication that a notification (i.e., notification message) is to be generated upon detection of the specific activity that is associated with the specific object.

Given the object definition, the activity definition, and the trigger parameters, the method includes generating a trigger event data structure (216). As illustrated in Table 1 below, the trigger event data structure can include the specific object, the specific activity associated with the specific object, the specific location, the time period of interest, and the priority indicator associated with the specific activity associated with the object. Using the trigger event data structure, the method includes monitoring a video stream from the one or more cameras and detecting occurrence of the event (218). As an example, the event can be the specific activity associated with the specific object in the specific location during the time period of interest.

Figure 6:
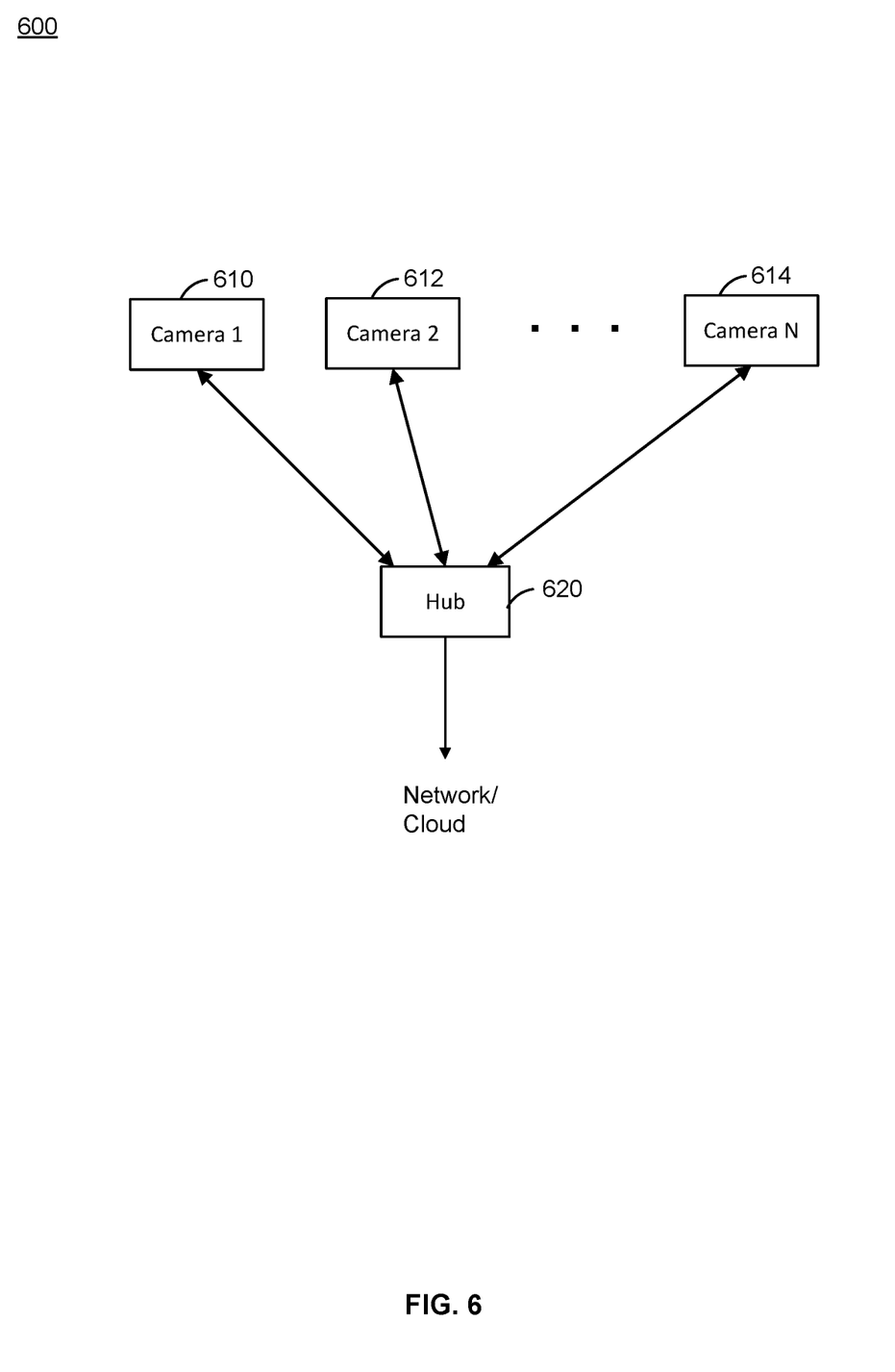
FIG. 6 is a simplified schematic diagram of a multi-camera system according to examples of the present disclosure.

In some embodiments, detection of the occurrence of the event is performed utilizing a monitoring process that can include turning on the one or more cameras in the home monitoring system and streaming video from the camera(s) to a hub as illustrated in FIG. 6 or to the cloud. In some implementations, processing is performed locally at the camera, whereas in other implementations, processing is performed remotely or using a combination of local and remote processing. Thus, processing can be performed partially or wholly on the camera, partially or wholly on the hub, or partially or wholly in the cloud. Once motion is detected, the system monitors the user-defined objects and activities, which can be video-based, image-based, or a combination thereof. For instance, if the video is detected with a low frame rate, the activities can be recognized based on images, not a video stream.

Once an object or activity is detected, the system queries the set of triggers using the trigger event data structure to determine if the object or activity is a user-defined object or activity. The set of resulting triggers is then filtered based on the time and location. If multiple matches are found, then the trigger with the highest priority is selected. If both matches have the same priority, the most specific trigger (i.e., the trigger having more specificity with respect to the object/activity/location/time) can be chosen. Although this example of event detection is described, the present disclosure is not limited to this particular framework and other event detection frameworks are included within the scope of the present disclosure. The pipeline that implements the event detection can be running on new video streams as they are received.

In an embodiment, the method includes determining that the notify/suppress indicator is associated with notification and generating a notification, which can also be referred to as a notification message, related to the specific activity (220). As an example, a short video clip associated with the event can be generated and delivered to the user. In some embodiments, the user is able to assign a notification description associated with the video clip, thereby enabling future notifications to utilize the notification description in place of the video clip. As an example, if the event was a specific resident leaving the home, the user could assign "John leaving the house" to the event, which would result in future notifications, rather than being a video clip of John leaving the house, being a text including the notification description "John leaving the house." In addition to textual descriptions, an audio description, an image, or the like could be utilized as components of the notification message. In other embodiments, if the notify/suppress indicator is associated with ignoring the specific activity, the notification related to the specific activity can be prevented.

As an example use case, a parent can utilize embodiments of the present disclosure to detect and generate a notification for a child crawling near a window, referred to as an event. In this use case, the object (i.e., child), the activity (i.e., crawling), the location (i.e., within a predetermined distance of a window), and the notification indicator, are specified using the trigger event data structure. Using the method illustrated in FIG. 2, this event can be detected and a notification generated when the event is detected.

Although notification is illustrated in FIG. 2, embodiments of the present disclosure provide the user with the ability to ignore objects/activities while still detecting, recognizing, and/or tracking other objects/activities. The ability to ignore objects/activities enables significant improvement in system usability since common or expected activities can be ignored, enabling the user to focus on the uncommon activities that are of interest. As an example, notifications that would conventionally be generated when residents of the home are detected can be prevented by embodiments of the present disclosure, thereby enabling the user to focus on non-residents who may be present in the home. Moreover, embodiments of the present disclosure enable both notification and/or prevention of notifications based on specific activities, even for common objects (e.g., people). For example, a resident walking in the home can be ignored, since this could be an expected activity, while a notification can be generated when a resident leaves the home since this can be of interest to the user. Thus, some activities can be ignored while other activities result in notifications. One of ordinary skill in the art would recognize many variations, modifications, and alternatives.

Figure 3:
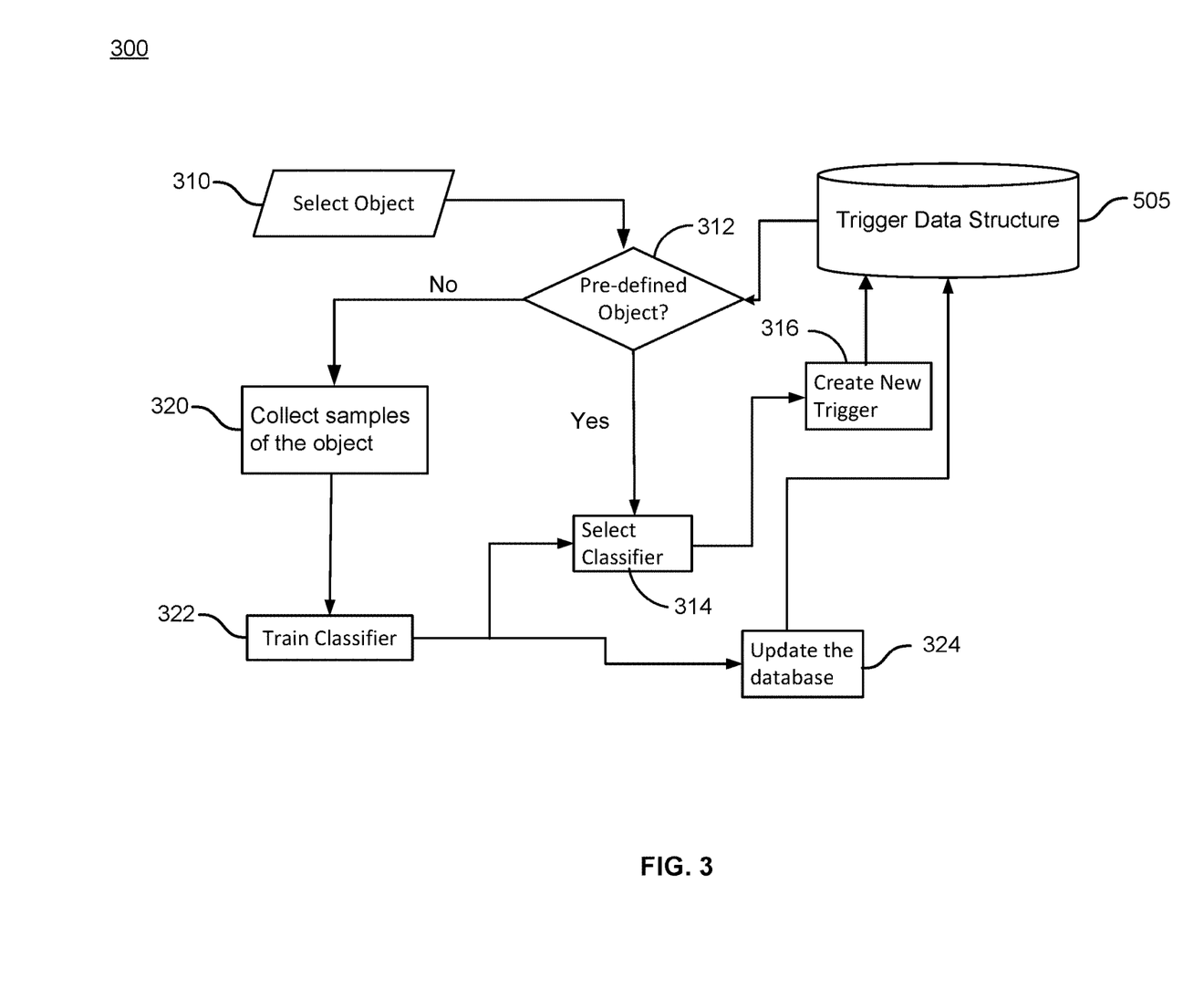
FIG. 3 is a flowchart conceptually illustrating object definition according to examples of the present disclosure.

FIG. 3 is a flowchart conceptually illustrating object definition according to examples of the present disclosure. Referring to FIG. 3, a user selects an object 310, denoted as an input by the parallelogram used to represent process 310. The object selection process can include selection of a pre-defined object or the addition of a new object. The graphical user interface 700 illustrated in FIG. 7 can be utilized as part of the object selection process. The object can be a variety of objects that can appear in an image or video stream, including a person, a pet, furniture, or the like. In some cases, the object is pre-defined, for example, a generic person or pet. A determination is made of whether the object selected by the user is pre-defined (312). Data available from the trigger event data structure 505 can be utilized in this determination. If the object is pre-defined, then a classifier that is appropriate for the particular pre-defined object is selected (314). For example, if the object is a generic person, one or more classifiers that detect people in a video stream can be utilized to create inputs for a new trigger 316. As described in relation to FIGS. 2 and 5, parameters related to the object, as well as activities can be included in the trigger definition. The newly created trigger is then stored in the trigger event data structure 505.

In addition to pre-defined objects, which can be specified by the user for recognition, detection, and tracking, embodiments of the present disclosure enable the user to specify objects that are not pre-defined. Referring to FIG. 3, if the determination is made that the object is not pre-defined (312), then one or more samples of the new object are collected (320). A user can specify and define these new objects by providing samples in the form of a picture (e.g., in the form of a file, a link, or the like) of the object. As an example, if a specific resident of the home is to be selected as the newly defined object, one or more pictures of the person could be provided as samples, one of the cameras in the system could be used to capture an image of the person, links to pictures of the person could be provided, or the like. In addition to people, other objects including animals and items present in the home can be specified and added as new objects, including remote controls, mobile phones, laptop computers, antiques, or the like. If the use desires to add a new generic object (e.g., a dog or cat, not a specific dog or cat), the user can obtain pictures of examples of the object from the internet or other source to provide as inputs to the system. Names or labels can be assigned to the new object(s) and these names/labels made available in the graphical user interface 700. For example, names/labels such as John, Sue, Mom, Dad, John's Phone, Cat, Dog, or the like can be assigned to newly defined objects.

Using the samples of the newly defined object, a classifier is trained (322) and an update is made (324) to the trigger event data structure 505 so that the newly defined object is then available as a pre-defined object in subsequent object definition processes. Accordingly, the "dictionary" of objects that can be detected grows over time as the user defines new objects that are added to the trigger event data structure. In some embodiments, a feature extractor is utilized for training on objects to generate data related to the object that can be used in training. Moreover, for people, a person identification system can be trained given a few number of instances for the particular person, with training based on features including face, body shape, clothes, and the like. Thus, either feature matching or album creation are included within the scope of the present disclosure.

For the newly defined object, the classifier trained at 324 is selected as the classifier (314) and a new trigger is created (316). Data related to this new trigger is then stored in the trigger event data structure 505. Thus, using embodiments of the present disclosure, a user is able to access not only pre-defined objects, but newly defined objects that are specific to the particular home environment. In some implementations, new objects defined by a first user can be made available to other users as pre-defined objects, thereby enhancing system performance.

Figure 4:
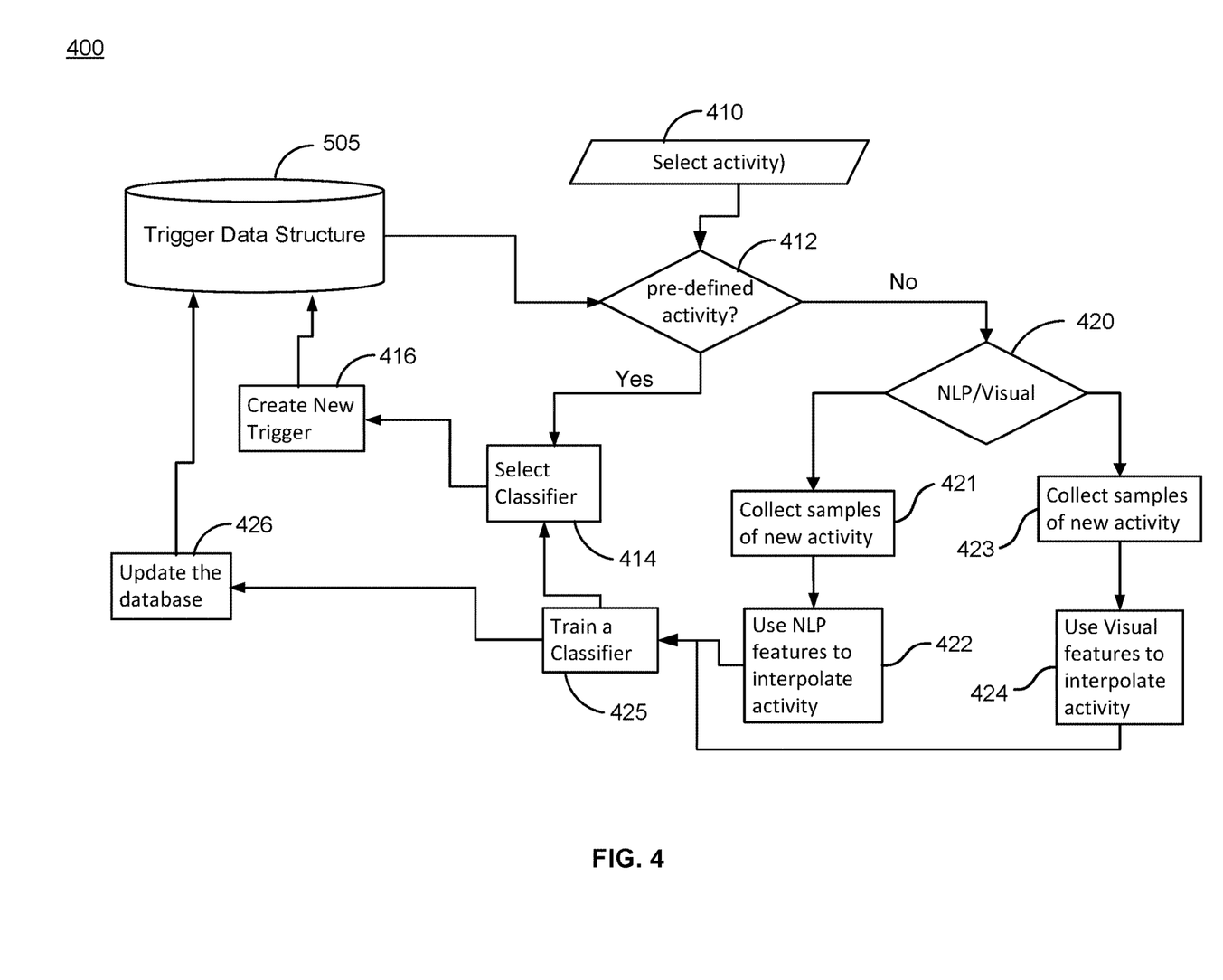
FIG. 4 is a flowchart conceptually illustrating activity definition according to examples of the present disclosure.

FIG. 4 is a flowchart conceptually illustrating activity definition according to examples of the present disclosure. Referring to FIG. 4, a user selects an activity 410, denoted as an input by the parallelogram used to represent process 410. The activity selection process can include selection of a pre-defined activity or the addition of a new activity. The graphical user interface 700 illustrated in FIG. 7 can be utilized as part of the activity selection process. In some cases, the activity is pre-defined, for example, running, crawling, losing consciousness, falling on the floor, object is replaced/located, opening/closing door, remote controlling an object, or the like. In some cases, the activity is independent of the object, whereas, in other cases, the activity is defined in terms of the object. For example, motion is an activity that can apply to a variety of objects. Alternatively, entry of a specific person through the front door is defined in terms of the object (i.e., the specific person) that is entering the home. Embodiments of the present disclosure enable the user to specify activities that are applicable to multiple objects as well as activities that are specific to a specific object.

A determination is made of whether the activity selected by the user is pre-defined (412). Data available from the trigger event data structure 505 can be utilized in this determination. If the activity is pre-defined, then a classifier that is appropriate for the particular pre-defined activity is selected (414). For example, if the activity is running, one or more classifiers that detect running in a video stream can be utilized to create inputs for a new trigger 416. Classifier selection can include customization of the classifier to the particular activity as appropriate. As described in relation to FIGS. 2 and 5, parameters related to the activity, as well as objects can be included in the trigger definition. The newly created trigger is then stored in the trigger event data structure 505.

In addition to pre-defined activities, which can be specified by the user for recognition, detection, and tracking, embodiments of the present disclosure enable the user to specify activities that are not pre-defined. Referring to FIG. 4, if the determination is made that the activity is not pre-defined (412), then natural language processing (NLP) or visual features are used to interpolate the specific activity. At 420, a decision is made, for example, by the user through the user device, to utilize NLP feature, visual features, or both NLP features and visual features. If the decision is made to utilize NLP features, then the user can define the new activity using a textual and/or a verbal description, which are collected as samples of the activity (421). In some embodiments, the user can be asked to provide additional samples in an iterative manner. Using the collected samples, the NLP features are utilized to interpolate the activity (422). Whether the new activity is defined in textual or verbal forms, the description of the new activity can be passed to the system in a textual format. The system can include a set of videos associated with particular textual/verbal descriptions, thereby enabling matching of the textual/verbal description to specific activities. For example, an NLP model could be trained that receives the description of the new activity and matches it to one of the pre-defined actions. If a match to a pre-defined action is not found, the system can be trained to produce a visual descriptor for the textual features.

If the decision is made to utilize visual features, then the user can define the new activity by demonstrating the new activity, with these demonstrations of the new activity by the user being collected as samples (423). For example, if the new activity is a hand reaching toward a lock, the user can move their hand toward the lock one or more times, capturing one or more video streams as samples of this new action. Similar samples can be collected for other actions, including opening a window, moving a TV, or the like. The one or more samples can then be used to extract visual features that are used to interpolate the new activity (424). Feedback from the user can be utilized to assist in the activity definition process, for example, by selecting samples that have the highest correlation to the desired new activity. In some implementations, for samples of the activity that are collected, the activity can be decomposed into an object to be tracked and an action to be detected. This information can be combined with parameters as illustrated in FIG. 5. Names/labels can be assigned to the new activity or activities and these names/labels made available in the graphical user interface 700.

In some embodiments, decision block 420 is utilized in such a manner that both NLP features and visual features are utilized. In this case, a first set of samples can be collected to extract NLP features and another set of samples can be collected to extract visual features. These sets may overlap as appropriate. As an example, a user could enter text such as "hand moving toward lock" as well as demonstrating and collecting a video stream of a hand moving toward a lock, thereby collecting both NLP samples as well as visual samples. If both processes are utilized, the samples can be collected in either order. Thus, decision block 420 represents the use of NLP features and/or visual features in both the alternative and in a combined process.

Using the interpolated activity, a classifier is trained (425) and an update is made (426) to the trigger event data structure 505 so that the newly defined activity is then available as a pre-defined activity in subsequent activity definition processes. Accordingly, the "dictionary" of activities that can be detected grows over time as the user defines new activities that are added to the trigger event data structure. In some implementations, new activities defined by a first user can be made available to other users as pre-defined activities, thereby enhancing system performance.

For the newly defined activity, the classifier trained at 424 is selected as the classifier (414) and a new trigger is created (416). Data related to this new trigger is then stored in the trigger event data structure 505. Thus, using embodiments of the present disclosure, a user is able to access not only pre-defined activities, but newly defined activities that are specific to the particular home environment.

FIG. 5 is a simplified schematic diagram illustrating a trigger event data structure according to examples of the present disclosure. As described herein, the trigger event data structure is utilized to define the one or more objects and/or the one or more activities and parameters related to these objects/activities that will result in (or prevent) notifications once an instance of the trigger is detected. Referring to FIG. 5, the trigger event data structure 505 includes one or more objects 510 and/or one or more activities 512. The one or more objects can include specific people, pets, items in a home, or the like. Information related to objects and their definition is discussed in additional detail with respect to FIG. 3. The one or more activities can include actions taken by the objects, actions done to an object (e.g., moving an item such as a laptop from one location in the home to another location), or the like. Information related to activities and their definition is discussed in additional detail with respect to FIG. 4.

The trigger event data structure 505 illustrated in FIG. 5 does not require that a user specify all of the elements illustrated in FIG. 5, since one or more of the elements can be populated with default values as described below. In one implementation, an object is the only user-defined element in the trigger event data structure, with the activities and parameters defined using default values. In another implementation, an activity is the only user-defined element in the trigger event data structure, with the objects and parameters defined using default values. For instance, if entry through a front door is to be detected, this could be applicable to all objects (or no objects), even the door being blown open during a storm. Moreover, lack of activity can be monitored using the trigger event data structure, for example, if a person is not moving for an extended period of time, a notification could be generated, providing an alert useful for an elderly resident. Thus, the definition of activities includes not only positive actions (e.g., moving or motion), including characteristics of the motion, such as speed, duration, repetition, or the like, but lack of action or motion (e.g., not moving). Additionally, notifications can be prevented for a specific object, independent of the activity/parameters, by setting the notify/suppress indicator to "Suppress" for the specific object. Similarly, notifications can be prevented for a specific activity, independent of the object/parameters by setting the notify/suppress indicator to "Suppress" for the specific activity.

In addition to objects and activities, the trigger event data structure can include information on parameters related to these objects/activities, including priority 520, location 522, time period 524, and a notify/suppress indicator 528. Table 1 is an example of data that can be included in the trigger event data structure 505. The priority, also referred to as a priority indicator, is listed in Table 1 as a ranking ranging from 1 (highest priority) to 5 (lowest priority=default), but this is not required and other means of ranking priority can be utilized. For example, a number of priorities higher than 5 can be utilized.

TABLE 1

| Priority | Object | Activity | Location | Time | Notify/Suppress |
| --- | --- | --- | --- | --- | --- |
| 1 | Child | Moving | Near Window | All | Notify |
| 4 | Resident 1 | All | All | AM | Suppress |
| 3 | Resident 1 | All | Office | All | Suppress |
| 5 | Resident 2 | All | All | M-F; 9-5 | Notify |
| 1 | Resident 3 | No motion | Living Room | 15 minute periods | Notify |
| 2 | Child | Moving | Hallway AND office | All | Notify |
| 3 | Resident 1 | Running | All | All | Suppress |
| 3 | Resident 4 | All | All | All | Suppress |
| 1 | All | Running | All | All | Notify |

As illustrated in Table 1, the trigger event data structure enables a user to define activities for specific people that occur in a specific location, during a specific time period, also referred to as a specific time period of interest. In an implementation in which one or more video cameras are located in a home of a family with multiple members, examples of the specific people can include a parent, a child, a pet, or the like. The location can be a room, for example, a child's room, so that the activity of a child in the room can be monitored during specific time periods. As illustrated in Table 1, default values can be utilized for the object/activity and/or one or more of the parameters once an object and/or activity is defined. The default values can be, for example, all objects, all activities, all locations, all time periods, the lowest priority (e.g., 5), and "Notify" set as the notify/suppress indicator. In another embodiment, the priority indicator is set to no priority so that any object/activity with any defined priority will take precedence over an object/activity with no priority.

The time periods can be defined in terms of a day of the week, AM/PM, a time period greater than one day, a time period less than one day, a time period of several hours, or the like. As an example, if a specific person in the home is identified in the trigger event data structure, default values could be all activities, all locations, all times, and notification. As another example, if a specific activity (e.g., Running) is identified in the trigger event data structure, default values could be applied such that any matching activity by any object, location, or time will result in a notification. For this activity, the presence of running in the home can indicate an emergency, thereby providing the desired notification. To prevent notifications for a specific resident (e.g., Resident 4), all activities, locations, and times could suppressed for this specific object.

Thus, utilizing the trigger event data structure, notifications based on the detection of specific objects and/or activities in a video stream can be implemented as well as prevention of notifications based on detection of other specific object and/or specific activities in the video stream. Accordingly, a resident present in a room (e.g., Office as listed in the $3^{rd}$ entry in Table 1) may be ignored since this is a regular activity performed by a known person, but a resident leaving the home may result in a notification.

Considering the last two entries in Table 1, which provide a notification for running by all objects while preventing all notifications related to Resident 4, the priority indicator will be used to determine which of these entries will take precedence. In this case, if Resident 4 is running, a notification will be generated based on the last entry in Table 1 since the priority for this entry has higher priority (Priority 1 vs. Priority 3) than the entry for suppressing notifications related to Resident 4. As discussed above, if both entries have the same priority, the most specific trigger (i.e., the trigger having more specificity with respect to the object/activity/location/time) can be chosen. Considering the last two entries, if the priority was equal, the last entry would take precedence since the activity and location are specified, whereas for the next to last entry, activity and location are default values. If the priority indicator for the last entry is lowered, for example, to 4, then running by Resident 4 would be suppressed, but running by other residents would result in notification.

FIG. 6 is a simplified schematic diagram of a multi-camera system according to examples of the present disclosure. As illustrated in FIG. 6, embodiments of the present disclosure are applicable to single-camera implementations as well as multi-camera implementations. Using multiple cameras 610, 612, . . . 614 in different locations, the location 524 in the trigger event data structure can be specified as a camera location (e.g., front door) or a location (both sides of a yard) captured by multiple cameras. Zones of a camera can be utilized to specify a location that is to be monitored, enabling a user to specify a specific portion of a field of view of a camera.

In a multi-camera implementation, the trigger event data structure can be utilized to limit notifications to specific activities occurring in locations associated with the individual cameras. As an example, motion of residents within the home, captured using cameras inside the home can be ignored while motion of resident leaving the home, captured using a camera at the front door could generate a notification. In other embodiments, multiple locations can be utilized in the event detection process. In these embodiments, a notification can be generated if the object or activity is detected at multiple locations (i.e., location 1 AND location 2) or if the object or activity is detected at one of several locations (i.e., location 1 OR location 2). Thus, multiple entries can be used to specify multiple locations or a single entry in some embodiments.

The multi-camera system illustrated in FIG. 6 enables processing to be performed locally on the cameras 610, 612, 614, on the hub 620, in the cloud, or using combinations of these options. As an example, all of the video captured by the cameras 610, 612, 614 could be transmitted through the hub 620 to the cloud for processing. As another example, the hub 620 can be utilized to process video from the cameras, only accessing the cloud as appropriate to deliver notifications. Moreover, processing at the cameras can be utilized. In some embodiments, the information in the trigger event data structure can be utilized to parse the processing operations, for example, activities that are limited to specific locations can be monitored using a camera in the specific location (e.g., activity in a room can be monitored using the camera in the room), activities that cover several locations can be monitored using the hub (e.g., activity that is applicable to several rooms), and the like. Accordingly, combinations of these options are available.

FIG. 7 is a simplified graphical user interface according to examples of the present disclosure. As illustrated in FIG. 7, a user is able to use graphical user interface 700 to specify one or more objects 710, one or more activities 720, one or more time periods of interest 730, one or more locations 740, the notify/suppress indicator 750, and the priority indicator 760. The graphical user interface can include drop down menus as illustrated, text entry boxes, or the like suitable for displaying lists of the data included in the trigger event data structure. A user can select one or more of the elements by choosing default values that are prepopulated, or entering new elements, including names of people and/or pets, specific rooms in the home, zones of a room, or the like. The graphical user interface can be utilized to correlate locations with cameras in various parts of the home, including a bedroom, a kitchen, a hallway, or the like. If a camera's field of view includes several locations (e.g., both the kitchen and den), this location can be specified as kitchen/den using the graphical user interface. If multiple locations are associated with a specific object and/or activity, logical operators including AND and OR can be utilized as illustrated in the last entry in Table 1. Although a start time and an end time are illustrated in FIG. 7, it will be appreciated that time periods of interest can be entered as units of time, for example, morning times (i.e., AM), evening times (i.e., PM), daytime (i.e., dawn to dusk), nighttime (i.e., dusk to dawn), and the like. The time periods are user-configurable, for example, defining nighttime as 9:00 PM to 5:00 AM rather than dusk to dawn. One of ordinary skill in the art would recognize many variations, modifications, and alternatives.

Figure 8:
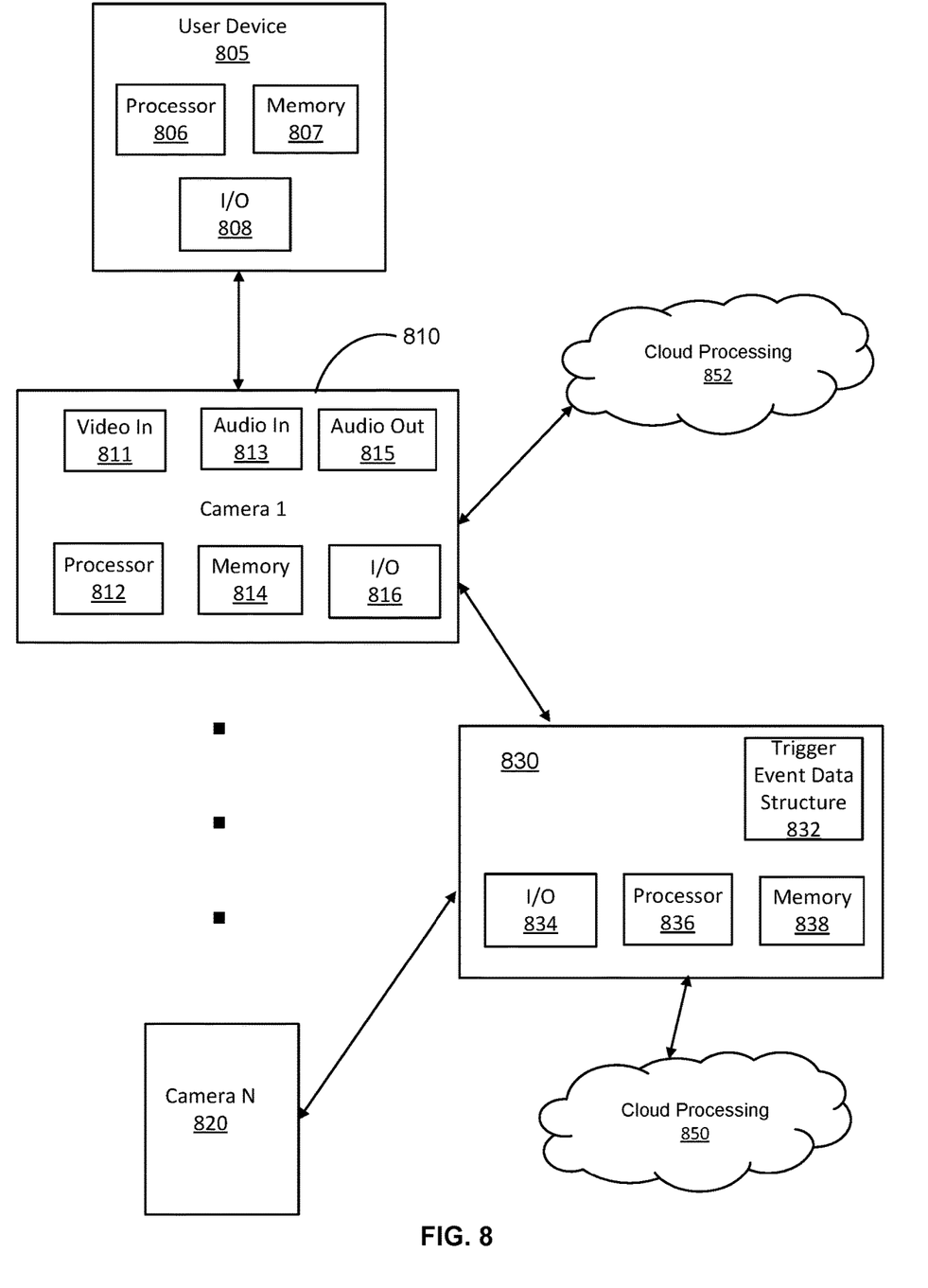
FIG. 8 is a simplified schematic diagram of multiple camera systems integrated with an optional hub according to examples of the present disclosure.

FIG. 8 is a simplified schematic diagram of a user device and multiple camera systems integrated with an optional hub according to examples of the present disclosure. As illustrated in FIG. 8, a user device 805 is communicatively coupled to a one or more cameras including camera 1 810 through camera N 820. The user device 805, which can be a computer, a smartphone, a tablet computer, or the like, can include a processor 806, memory 807, and an input/output unit 808 that enables communication with cameras 1 through N, hub 830, described below, or internet resources including cloud processing element 850 and/or 852. As described herein, the user device 805 can be used by a user to create, modify, and update the trigger event data structure, for example, using the graphical user interface illustrated in FIG. 7.

One or more cameras are illustrated by camera 1 810 and camera N 820. The cameras can be communicatively coupled together through wired or wireless connections or may operate independently. The one or more cameras are communicatively coupled with user device 805 as described above. In some embodiments, the functionality of user device 805 is partially or fully integrated into the one or more cameras, for example, by providing a screen coupled to the camera to enable input/output functionality, processing, and/or memory. As illustrated in FIG. 8, camera 1 810, as well as the other cameras, can be communicatively coupled to the cloud, for example, through a wireless connection.

Hub 830 is communicatively coupled to the one or more cameras and can be communicatively coupled to the user device 805. As discussed in relation to FIG. 6, processing of data captured using the cameras can be performed partially or wholly using the camera, the hub, or in the cloud. In the embodiment illustrated in FIG. 8, hub 830 includes a processor 836, memory 838, and I/O unit 834. In this embodiment, the trigger event data structure 832 is maintained on the hub and accessible by the user device 805, the one or more cameras, and the cloud. In other embodiments, the trigger event data structure is maintained on the user device 805. In yet other embodiments, data stored in the trigger event data structure can be distributed as appropriate to the particular application, for example, data specific to a camera (e.g., a camera located in a bedroom) can be stored on a camera located in the location defined in the trigger event data structure.

Some or all of the processes/methods 200, 300, or 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating, for at least a first object of a plurality of objects and based on input received from a user device, data including (i) information about the first object, (ii) information about an activity, (iii) information about a location, (iv) information about a time period of interest and comprising a start time and an end time, and (v) information about a notify/suppress indicator;
    receiving, from a first camera, a video stream;
    detecting, based on the data, that the video stream shows the first object;
    detecting, for the first object, occurrence of the activity in the location during the time period of interest;
    determining that the occurrence falls between the start time and the end time;
    determining that the notify/suppress indicator indicates that a notification is to be generated; and
    generating the notification related to the occurrence of the activity.

2. The computer-implemented method of claim 1, wherein the data further includes (vi) information about a priority indicator associated with the first object.

3. The computer-implemented method of claim 1, wherein the information about the activity comprises a type of motion, characteristics of the motion, or a lack of motion.

4. The computer-implemented method of claim 3, wherein the characteristics of the motion comprise at least one of speed of the motion or duration of the motion.

5. The computer-implemented method of claim 1, further comprising adding a new object to the plurality of objects, wherein adding the new object comprises:
    collecting one or more samples of the new object, wherein the one or more samples comprise at least a picture or a video clip; and
    training a classifier using the one or more samples of the new object.

6. The computer-implemented method of claim 1, wherein the location comprises a portion of a field of view of a camera and detecting the occurrence of the activity comprises detection of the first object entering or exiting the portion of the field of view.

7. The computer-implemented method of claim 1, wherein receiving the video stream comprises receiving the video stream from the first camera located at the location, the method further comprising:
    receiving, for the first object, information about a second location;
    receiving a second video stream from a second camera;
    detecting, for the first object, occurrence of the activity in the second location during the time period of interest; and
    generating a second notification related to the occurrence of the activity in the second location during the time period of interest.

8. The computer-implemented method of claim 7, the method further comprising:
    receiving, for a second object, data including information about the location, a second activity, and a second time period of interest;
    detecting, in the video stream, for the second object, occurrence of the second activity in the location during the second time period of interest; and
    generating a second notification related to the occurrence of the second activity.

9. The computer-implemented method of claim 7, wherein at least one of the location or the second location comprises a portion of a field of view associated with the first camera or the second camera, respectively.

10. The computer-implemented method of claim 1, wherein the notification comprises a video clip.

11. The computer-implemented method of claim 5, further comprising:
    storing, prior to receiving the video stream, a data structure based on the input, the data structure comprising an image of the first object, a video sample of the activity, a description of the location, and the start time and the end time, wherein:
    detecting that the video stream shows the first object comprises detecting a presence of the first object in the video steam based on the image from the data structure; and
    detecting the occurrence of the activity comprises detecting that the video stream shows a performance of the activity by the first object based on the video sample and that the performance occurs between the start time and the end time in the location.

12. A computer-implemented method, comprising:
generating, for at least a first object of a plurality of objects and based on input received from a user device, data including (i) information about the first object, (ii) information about an activity, (iii) information about a location, (iv) information about a time period of interest and comprising a start time and an end time, (v) information about a notify/suppress indicator, and (vi) information about a priority indicator associated with the first object;
receiving, from a first camera, a video stream;
detecting, based on the data, that the video stream shows the first object;
detecting, for the first object, occurrence of the activity in the location during the time period of interest;
determining that the occurrence falls between the start time and the end time;
determining, based at least in part on the notify/suppress indicator and the priority indicator, that a notification is to be generated; and
generating the notification related to the occurrence of the activity.

13. The computer-implemented method of claim 12, wherein the information about the activity comprises a speed or a duration of motion by the first object.

14. The computer-implemented method of claim 12, further comprising adding a new object to the plurality of objects, wherein adding the new object comprises:
collecting one or more samples of the new object, wherein the one or more samples comprise at least a picture or a video clip; and
training a classifier using the one or more samples of the new object.

15. The computer-implemented method of claim 12, further comprising, receiving, for the first object, data including (i) information about a new activity, (ii) information about a new location, (iii) information about a new time period of interest, (iv) information about a new notify/suppress indicator, and (v) information about an updated priority indicator.

16. The computer-implemented method of claim 12, wherein the location comprises a portion of a field of view of a camera and detecting the occurrence of the activity comprises detection of the first object entering or exiting the portion of the field of view.

17. The computer-implemented method of claim 12, wherein receiving the video stream comprises receiving the video stream from the first camera located at the location, the method further comprising:
receiving, for the first object, information about a second location;
receiving a second video stream from a second camera;
detecting, for the first object, occurrence of the activity in the second location during the time period of interest; and
generating a second notification related to the occurrence of the activity in the second location during the time period of interest.

18. A system comprising:
one or more processors; and
one or more memories storing computer-readable instructions that, upon execution by the one or more processors, configure the system to:
generate, for at least a first object of a plurality of objects and based on input received from a user device, data including (i) information about the first object, (ii) information about an activity, (iii) information about a location, (iv) information about a time period of interest and comprising a start time and an end time, and (v) information about a notify/suppress indicator;
receive, from a first camera, a video stream;
detect, based on the data, that the video stream shows the first object;
detect, for the first object, occurrence of the activity in the location during the time period of interest;
determine that the occurrence falls between the start time and the end time;
determine that the notify/suppress indicator indicates that a notification is to be generated; and
generate the notification related to the occurrence of the activity.

19. The system of claim 18, wherein the one or more memories store further computer-readable instructions that, upon execution by the one or more processors, configure the system to:
receive, for the first object, information about a second location;
receive a second video stream from a second camera;
detect, for the first object, occurrence of the activity in the second location during the time period of interest; and
generate a second notification related to the occurrence of the activity in the second location during the time period of interest.

20. The system of claim 19, wherein the one or more memories store additional computer-readable instructions that, upon execution by the one or more processors, configure the system to:
receive, for a second object, data including information about the location, a second activity, and a second time period of interest;
detect, in the video stream, for the second object, occurrence of the second activity in the location during the second time period of interest; and
generate a second notification related to the occurrence of the second activity.

21. The system of claim 18, wherein the one or more memories store further computer-readable instructions that, upon execution by the one or more processors, configure the system to add a new object to the plurality of objects by at least:
collecting one or more samples of the new object, wherein the one or more samples comprise at least a picture or a video clip; and
training a classifier using the one or more samples of the new object.

* * * * *